(12) United States Patent  
Nannie

(10) Patent No.: US 7,546,767 B1  
(45) Date of Patent: Jun. 16, 2009

(54) MAGNETIC BALANCER APPARATUS AND METHOD

(76) Inventor: Rondal L. Nannie, 1269 Spring Bay Rd., East Peoria, IL (US) 61611

( * ) Notice: Subject to any disclaimer, the term of this patent is extended or adjusted under 35 U.S.C. 154(b) by 502 days.

(21) Appl. No.: 11/221,065

(22) Filed: Sep. 7, 2005

(51) Int. Cl.
*G01M 1/04* (2006.01)
(52) U.S. Cl. ................................................ 73/480
(58) Field of Classification Search ............. 73/459, 73/460, 480
See application file for complete search history.

(56) References Cited

U.S. PATENT DOCUMENTS

D398,620 S    9/1998  McCormack
5,939,629 A *  8/1999  Abboud ..................... 73/480

* cited by examiner

*Primary Examiner*—John E Chapman  
(74) *Attorney, Agent, or Firm*—Golden's M&I; James B. Golden

(57) ABSTRACT

A magnetic balancer for improving component balance, ease of use, durability, and portability of components having at least one rod member, and at least two magnets. The at least one rod member has a radiused pair of end portions suspended between at least two magnets with one of the pair of end portions being free floating. The principle use is for balancing wheels, however, other components will benefit from this invention. For example, propellers, spinners, boat props, rotors, and clutches will benefit from this application.

9 Claims, 1 Drawing Sheet

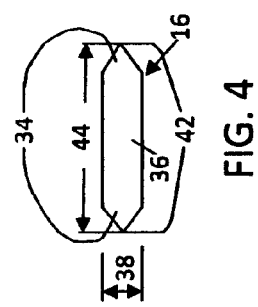
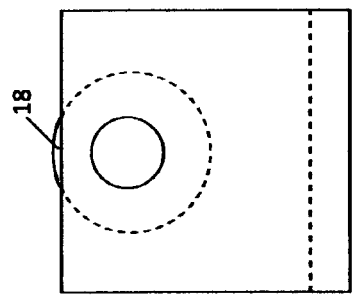
FIG. 4
FIG. 3
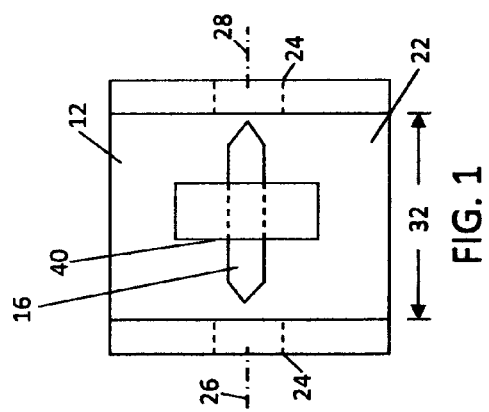
FIG. 1
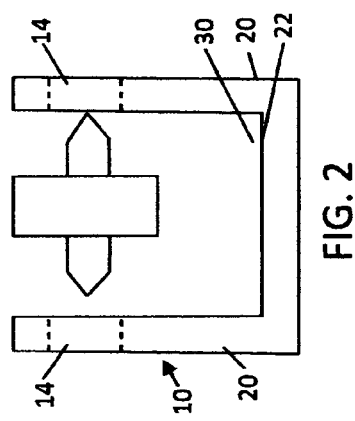
FIG. 2

1

MAGNETIC BALANCER APPARATUS AND METHOD

TECHNICAL FIELD

This invention relates generally to a magnetic balancer and more particularly to a magnetic balancer having a component (s) disposed on at least one rod member and the component and at least one rod member are suspended by a magnetic field.

BACKGROUND ART

Balancing components, such as, plastic wheels, radio controlled airplane propellers, and the like have become increasingly important. For example, the increase in popularity of events like the Pinewood Derby® has caused modification to the racers for improved performance. One avenue for participants to improve performance is to balance the wheels on the racers being used. Typically, the wheels being used are manufactured from individual molds. Each of the wheels that are manufactured take on characteristics of the molds being used and as such may require balancing for improved performance. In addition, the skill level of participants is such that it would be beneficial to have a balancer that is easy to use, durable, and portable.

Various balancer designs have been developed in an attempt to improve balancing of components. For example, U.S. Pat. No. D398,620 to McCormack discloses a magnetic suspension apparatus that supposedly suspends components using magnets. However, the design disclosed requires many set up adjustments that if not adhered to properly would cause the component being balance to become less balanced. One problem inherent with the design is having a base member formed from rods which if not positioned correctly would cause a misalignment of the magnets used for balancing. Another problem, having the rod used for suspending components in contact with each of the magnets adds to the overall system friction and in additional the friction at one end compared to the friction at the other end would probably not be uniform and as such cause the component to be less balanced. Yet another problem, the use of cones for securing the component with the rod if not balanced separately may lead to a further imbalance of the component being balanced.

The present invention is directed to overcoming one or more of the problems set forth above.

DISCLOSURE OF THE INVENTION

In one aspect of the present invention, a magnetic balancer for balancing components includes a base member that has at least two support members. A magnet is in engagement with each of the at least two support members, and each of the magnets is inline with one another. At least one rod member has a pair of end portions and an intermediate portion that is disposed between the pair of end portions. Each of the pair of end portions has an end surface that is radiused. The at least one rod member is magnetically suspended and inline with the at least two magnets with only one of the end surfaces being in contact with one of the at least two magnets.

In another aspect of the present invention, a method of balancing a component has a bore, at least one rod member, and at least two magnets. The method includes the steps of inserting the at least one rod member into the bore of the component. Placing the component and the at least one rod member between the at least two magnets and balancing the component.

BRIEF DESCRIPTION OF THE DRAWINGS

FIG. 1 is a diagrammatic top plan view of an embodiment of the present invention;

FIG. 2 is a diagrammatic front plan view of an embodiment of the present invention;

FIG. 3 is a diagrammatic side plan view of an embodiment of the present invention; and FIG. 4 is a diagrammatic view of at least one rod member embodying the present invention.

BEST MODE FOR CARRYING OUT THE INVENTION

Turning to the drawings and particularly FIG. 1-FIG. 3 representing a magnetic balancer (10) is shown with one embodiment of the present invention. As seen therein, the magnetic balancer (10) includes a base member (12), at least two magnets (14), and at least one rod member (16). The magnetic balancer (10) aids in balancing components (18). In one embodiment, as shown, the component (18) being balanced is a wheel. However, it should be understood that the component (18) being balanced may take many forms as long as it is capable of being rotated between at least two magnets (14). For example, propellers, spinners, boat props, rotors, clutches, and the like may be balanced without departing from the spirit of the invention.

Referring to FIG. 2, the base member (12) includes at least two support members (20) and a bottom member (22). Each of the at least two support members (20) has one of the at least two magnets (14) disposed therein. As shown in the present invention, each of the at least two magnets (14) is disposed in one of the at least two bores (24) located in each of the at least two support members (20). A first longitudinal axis (26) and a second longitudinal axis (28) correspond to the at least two bores (24). The first and second longitudinal axes (26, 28) are coincident and as such place the at least two magnets (14) inline with one another. The at least two magnets (14) are fastened in the bore using techniques that are well known to one skilled in the art. For example, adhesives, tapes, fasteners, and the like may be used without departing from the spirit of the invention. In addition, another embodiment may have the at least two magnets attached to an inner surface (30) of one or both of the at least two support members (20) (not shown) without departing from the spirit of the invention. Furthermore, the at least two magnets (14) may be adjustable to aid in balancing components (18). The bottom member (22) is disposed between the at least two support members (20). The bottom member (22) has a first length (32) measured from the inner surface (30) of at least two support members (20). The bottom member (22) is generally flat to aid in sitting the magnetic balancer (10) on flat surfaces, such as, work benches, tables, and the like. The bottom member (22) is generally rigid to maintain the position of the at least two magnets (14) during the life of the magnetic balancer (10). In particular, the at least two support members (20) and the bottom member (22) generally forms a "U" configuration. However, it should be understood to one skilled in the art that various other configurations may be used without departing from the spirit of the invention. For example, a square configuration may be used without departing from the spirit of the invention. In addition, the magnetic balancer (10) as shown balances a single component (18). However multiple components (18) may be balanced without departing from the spirit of the invention. For example, the base member (12) is scalable to accommodate the balancing of a number of components with additional support members with accompanying magnets to suspend the at least one rod member (16) and components (18). An example of balancing multiple components (18) would have the base member (12) configured generally as an "E" with three support members and one of the at least one rod member (16) with component (18) suspended between two of the at least two support members (20) and another one of the at least one rod member (16) with another component (18) suspended between two of the at least two support members (20). Further more, the bottom member (22) may be adjustable to aid in accommodating different at least one rod members (16) without departing from the spirit of the invention. Another configuration may have the bottom member (22) and at least two support members (20) capable of being taken apart for portability. The base member (12) is typically made from aluminum, plastic, and the like without departing from the spirit of the invention.

Referring to FIG. 4, the at least one rod member (16) has a pair of end portions (34) and an intermediate portion (36). The intermediate portion (36) is disposed between the pair of end portions (34) and has a first diameter (38). The first diameter (38) has a magnitude that generally corresponds to the component bore (40), such that, a slight press fit occurs when the at least one rod member (16) is inserted through the component bore (40). It should be recognized that various at least one rod members (16) are used to correspond to the component bore (40) of different components (18) to be balanced. For example, the component bore (40) of a plastic wheel might have the first diameter (38) smaller in magnitude when compared to the component bore (40) of a rotor. Therefore, multiple at least one rod members (16) are used to maintain a slight press fit in balancing different components (18). The slight press fit between the intermediate portion (36) and the component bore (40) allows the at least one rod member (16) to spin in tandem with the component (18) being balanced. In addition, maintaining a slight press fit aids in balancing without causing characteristic changes with the component (18). For example, components (18), such as, plastic wheels have the component bore (40) formed from plastic. If one was to insert at least one rod member (16) through the component bore (40) with greater contact than the slight press fit may cause damage to the component bore (40) and thus damage the component (18) being balanced. The pair of end portions (34) each has an end surface (42). Each end surface (42) is radiused to improve the life of the magnetic balancer (10). The radiused, i.e., rounded end surface (42) is adapted to provide a smooth contact with at least two magnets (14) being used to balance components (18). The smooth contact reduces scratches on the at least two magnets (14) which improve the precision and life of the magnetic balancer (10). It should be recognized to one skilled in the art that scratches associated with the at least two magnets (14) reduces the efficiency of the magnetic balancer (10) by increasing friction between the at least one magnet (14) and the at least one rod member (16). The at least one rod member (16) is suspended and inline between two of the at least two magnets (14) and the magnetism of the at least two magnets (14) suspends the at least one rod member (16). In one embodiment, the magnetism for suspension of the at least one rod member (16) is characteristic of rare earth magnets, i.e., nickel ferrite magnets. However, it should be understood that various other types of magnets, such as, permanent magnets, temporary magnets, electromagnets, and the like may be used without departing from the spirit of the invention. For example, magnetite, alloys of iron, nickel, and/or cobalt may be suitable for suspending the at least one rod member (16). In addition, induced magnetic fields using electrical current to make an electromagnet may be used to aid in suspending the at least one rod member (16). The suspension of the at least one rod member (16) has one of the pair of end portions (34) contacting one of the at least two magnets (14) and the other one of the pair of end portions (34) free from the at least two magnets (14). Furthermore, each of the pair of end portions (34) is generally tapered. However other variations may be accomplished without departing from the spirit of the invention. For example, the intermediate portion (36) may transition directly to the radiused end surface (42) without departing from the spirit of the invention. Due to economic characteristics, the at least one rod member (16) is generally made from steel. However any magnetic material would suffice without departing from the spirit of the invention. The at least one rod member (16) has a second length (44) measured between the pair of end portions (34). The first length (32) of the bottom member (22) is generally greater than the second length (44) of the at least one rod member (16). The greater length of the bottom member (22) permits the at least one rod member (16) to be suspended between the at least two magnets, such that, one of the pair of end portions (34) is freely suspended.

INDUSTRIAL APPLICABILITY

With reference to the figs. and in operation, improved balancing of components (18) is achieved by using the magnetic balancer (10). The component (18) for balancing has the at least one rod member (16) inserted through the component bore (40) and the component is generally centered on the at least one rod member (16). The at least one rod member (16) and component (18) are place between at least two magnets (14) for magnetic suspension. Provide a rotational movement to the component (18). The component (18) and the at least one rod member (16) are spun in tandem due to the slight press fit previously discussed. Generally, after being spun the heavy side of the component (18) will be towards the bottom member (22) due to gravity. Mark the wheel directly opposite the bottom member (22) being careful not to damage the component (18). At this time, one may add or remove material to balance the component (18). In the case of removing weight, one would use sandpaper, burr, and the like to remove material from the heavy side which is generally 180 degrees from the mark place on the component (18). In the case of adding weight, one would apply a substance, such as, fingernail polish, and the like that do not effect the component (18) being balanced.

Magnetic balancers (10) that utilize the at least one rod member (16) with the component (18) have improved operation. The radiused end surfaces (42) as discussed above provide longer life with improved precision. Placement of the at least one rod member (16) between the at least two magnets (14), such that, one of the pair of end portions (34) is always free floating, i.e., non-contact with one of the at least two magnets (14) and reduces the friction of the magnetic balancer (10) during operation. Reduction of friction during balancing of component (18) improves the precision as well as usage of the magnetic balancer (10). Furthermore, the magnetic balancer (10) as discussed above allows for less complex configurations which enhance usage, durability, portability, and precision.

Other aspects, objects and advantages of this invention can be obtained from a study of the drawings, the disclosure and the appended claims.

What is claimed is:

1. A magnetic balancer for balancing components, comprising:
   a base member having a at least two support members, a magnet being in engagement with each of said at least two support members, and each of said magnets being inline with one another; and at least one rod member having a pair of end portions and an intermediate portion being disposed between said pair of end portions, each of said pair of end portions having a end surface being radiused, and said at least one rod member being magnetically suspended and inline with said at least two magnets with only one of said end surfaces being in contact with one of said at least two magnets.

2. A magnetic balancer, as set forth in claim 1, wherein said intermediate portion having a first diameter and said first diameter adapted to provide a slight press fit with said component.

3. A magnetic balancer, as set forth in claim 1, wherein said pair of end portions being generally tapered.

4. A magnetic balancer, as set forth in claim 1, wherein said at least one rod member being made from steel.

5. A magnetic balancer, as set forth in claim 1, wherein said base member having a bottom member disposed between said at least two support members.

6. A magnetic balancer, as set forth in claim 5, wherein said base member being a "U" configuration.

7. A magnetic balancer, as set forth in claim 5, wherein said bottom member having a first length and said at least one rod member having a second length and said first length being generally greater than said second length.

8. A magnetic balancer, as set forth in claim 1, wherein each of said magnets being adjustable.

9. A magnetic balancer, as set forth in claim 1, wherein said component being balanced corresponding to a plastic wheel, said plastic wheel having a bore, and said at least one rod member being disposed with a slight press fit in said bore.

* * * * *